United States Patent
Oueslati et al.

(10) Patent No.: US 9,657,523 B2
(45) Date of Patent: May 23, 2017

(54) BOTTOMHOLE ASSEMBLY DESIGN METHOD TO REDUCE ROTATIONAL LOADS

(71) Applicants: Hatem Oueslati, Hannover (DE);
Hanno Reckmann, Nienhagen (DE);
Jayesh R. Jain, The Woodlands, TX (US)

(72) Inventors: Hatem Oueslati, Hannover (DE);
Hanno Reckmann, Nienhagen (DE);
Jayesh R. Jain, The Woodlands, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 896 days.

(21) Appl. No.: 13/896,866

(22) Filed: May 17, 2013

(65) Prior Publication Data

US 2014/0338977 A1 Nov. 20, 2014

(51) Int. Cl.
*E21B 41/00* (2006.01)
*E21B 44/00* (2006.01)
(Continued)

(52) U.S. Cl.
CPC ............ *E21B 7/00* (2013.01); *E21B 41/0092* (2013.01); *E21B 44/00* (2013.01); *E21B 10/00* (2013.01);
(Continued)

(58) Field of Classification Search
CPC ...... E21B 44/00; E21B 41/0092; E21B 10/00; E21B 17/00; E21B 47/16; G05B 13/048; G05B 23/0243; G01H 1/10; G06F 17/18
See application file for complete search history.

(56) References Cited

U.S. PATENT DOCUMENTS 3,949,150 A * 4/1976 Mason ............... E21B 17/07
175/321
4,043,410 A * 8/1977 Bennett ............. E21B 17/1064
175/323
(Continued)

OTHER PUBLICATIONS

Aslaksen, et al. "Integrated FEA Modeling Offers System Approach to Drillstring Optimization" IADC/SPE Conference held in Miami Fl. Feb. 21-23, 2006, 16 pages.
(Continued)

*Primary Examiner* — Akash Saxena
(74) *Attorney, Agent, or Firm* — Cantor Colburn LLP (57) ABSTRACT

A method for estimating a location for disposing a tool in a drill tubular having a drill bit includes performing a modal analysis of the drill tubular to determine natural eigenfrequencies and corresponding eigenmodes of torsional oscillations of the model and selecting a predominant natural eigenfrequency and corresponding eigenmode from the determined natural eigenfrequencies and corresponding eigenmodes. The method further includes performing a forced modal analysis of the drill tubular at the predominant eigenfrequency with a force or moment acting on the drill bit to provide a correlation between forced torsional deflection amplitude and position and estimating the position to be within a range of positions wherein a vibration qualification of the tool is greater or equal to the torsional deflection amplitude throughout the range.

20 Claims, 5 Drawing Sheets

(51) Int. Cl.
| | |
|---|---|
| *G06F 17/18* | (2006.01) |
| *G05B 23/02* | (2006.01) |
| *E21B 7/00* | (2006.01) |
| *E21B 17/00* | (2006.01) |
| *G01H 1/10* | (2006.01) |
| *G05B 13/04* | (2006.01) |
| *E21B 47/16* | (2006.01) |
| *E21B 10/00* | (2006.01) |

(52) U.S. Cl.
CPC .............. *E21B 17/00* (2013.01); *E21B 47/16* (2013.01); *G01H 1/10* (2013.01); *G05B 13/048* (2013.01); *G05B 23/0243* (2013.01); *G06F 17/18* (2013.01)

(56) References Cited

U.S. PATENT DOCUMENTS

| | | | | |
|---|---|---|---|---|
| 5,117,926 | A * | 6/1992 | Worrall | E21B 41/00 175/56 |
| 5,130,951 | A * | 7/1992 | Kingman | E21B 44/00 367/31 |
| 5,313,829 | A * | 5/1994 | Paslay | G01H 1/00 166/250.01 |
| 5,321,981 | A | 6/1994 | Macpherson | |
| 5,402,677 | A * | 4/1995 | Paslay | G01H 1/00 175/40 |
| 6,065,332 | A * | 5/2000 | Dominick | G01H 1/10 175/56 |
| 6,785,641 | B1 * | 8/2004 | Huang | E21B 44/00 175/45 |
| 8,014,987 | B2 | 9/2011 | Pabon et al. | |
| 8,214,188 | B2 | 7/2012 | Bailey et al. | |
| 8,220,564 | B2 | 7/2012 | Runquist et al. | |
| 8,504,342 | B2 * | 8/2013 | Bailey | E21B 41/00 166/369 |
| 2004/0035608 | A1 | 2/2004 | Meehan et al. | |
| 2004/0221985 | A1 * | 11/2004 | Hill | E21B 44/00 166/250.01 |
| 2004/0237640 | A1 * | 12/2004 | Meister | E21B 49/006 73/152.48 |
| 2007/0185696 | A1 | 8/2007 | Moran et al. | |
| 2007/0278009 | A1 * | 12/2007 | Hernandez | E21B 47/00 175/40 |
| 2007/0289778 | A1 * | 12/2007 | Watkins | E21B 28/00 175/40 |
| 2008/0135290 | A1 * | 6/2008 | Hopwood | E21B 44/00 175/24 |
| 2008/0156531 | A1 | 7/2008 | Boone et al. | |
| 2009/0078467 | A1 * | 3/2009 | Castillo | E21B 25/10 175/249 |
| 2009/0114445 | A1 | 5/2009 | Dashevskiy | |
| 2009/0229882 | A1 * | 9/2009 | Quernheim | E21B 47/01 175/26 |
| 2010/0032165 | A1 | 2/2010 | Bailey et al. | |
| 2011/0077924 | A1 | 3/2011 | Ertas et al. | |
| 2011/0186353 | A1 * | 8/2011 | Turner | G05B 13/048 175/40 |
| 2011/0232966 | A1 * | 9/2011 | Kyllingstad | E21B 44/00 175/24 |
| 2011/0245980 | A1 * | 10/2011 | Nessjoen | E21B 44/00 700/280 |
| 2012/0016589 | A1 | 1/2012 | Li et al. | |
| 2012/0048621 | A1 * | 3/2012 | Stewart | E21B 7/04 175/56 |
| 2012/0123757 | A1 | 5/2012 | Ertas et al. | |
| 2012/0130693 | A1 * | 5/2012 | Ertas | E21B 44/00 703/2 |
| 2012/0234600 | A1 * | 9/2012 | Lee | E21B 49/006 175/57 |
| 2013/0025939 | A1 | 1/2013 | Heliot et al. | |
| 2013/0186687 | A1 * | 7/2013 | Snyder | E21B 7/04 175/40 |
| 2013/0277110 | A1 * | 10/2013 | Doris | E21B 44/00 175/24 |
| 2014/0232548 | A1 * | 8/2014 | Hohl | E21B 17/00 340/854.4 |
| 2014/0318865 | A1 * | 10/2014 | Doris | E21B 44/00 175/40 |
| 2014/0338977 | A1 * | 11/2014 | Oueslati | E21B 7/00 175/45 |
| 2015/0014058 | A1 * | 1/2015 | Wassell | E21B 44/00 175/48 |
| 2015/0083492 | A1 * | 3/2015 | Wassell | E21B 44/00 175/24 |
| 2015/0083493 | A1 * | 3/2015 | Wassell | E21B 44/00 175/40 |
| 2015/0122547 | A1 * | 5/2015 | Hohl | E21B 7/00 175/40 |
| 2016/0053547 | A1 * | 2/2016 | Samuel | E21B 10/00 175/57 |
| 2016/0237802 | A1 * | 8/2016 | Boone | E21B 7/06 |

OTHER PUBLICATIONS

Bailey, et al. "Design Tools and Workflows to Mitigate Drilling Vibrations". SPE 135439. SPE Annual Technical Conference and Exhibition held in Florence, Italy, Sep. 19-22, 2010. p. 1.
Bailey, et al. "Managing Drilling Vibrations Through BHA Design Optimization". SPE 139426. International Petroleum Technology Conference Doha, Qatar, Dec. 7-9, 2009. Dec. 2010 SPE Drilling & Completion. pp. 458-471.
Mitchell, et al. "Case Studies of BHA Vibration Failure". SPE 16675. 62nd Annual Technical Confernece and Exhibtion of the Society of Petroleum Engineers held in Dallas TX Sep. 27-30, 1987. pp. 1-14.
Ertas, "Drillstring Mechanics Model for Surveillance, Root Cause Analysis, and Mitigation of Torsional and Axial Vibrations", SPE/IADC Drilling Conference and Exhibition, Amsterdam, The Netherlands, Mar. 5-7, 2013, 14 pages.
Bailey, J.R., "Design Evolution of Drilling Tools to Mitigate Vibrations", SPE/IADC 163503, SPE/IADC Driling Conference and Exhibition held in Amsterdam, The Netherlands, Mar. 5-7, 2013. pp. 1-23.
Notification of Transmittal of the International Search Report and the Written Opinion of the International Searching Authority, or the Declaration; PCT/US2014/038335; Oct. 1, 2014, 11 pages.

* cited by examiner

BOTTOMHOLE ASSEMBLY DESIGN METHOD TO REDUCE ROTATIONAL LOADS

BACKGROUND

There are many types of tools for drilling a borehole into an earth formation or for characterizing the formation by performing measurements from the borehole. These tools are typically disposed at the distal end of a drill tubular that is used to drill the borehole with a rotating drill bit. The arrangement of the downhole tools is generally referred to as a bottomhole assembly (BHA). While the borehole is being drilled, the tools in the BHA may be subjected to severe vibration as the drill bit interacts with the hard rock formations. One type of vibration that occurs from this type of interaction is tangential vibration, which is also referred to as high frequency torsional oscillation. High frequency torsional oscillation is different from stick-slip vibration, which typically occurs at the first torsional natural frequency of the drilling system and is usually lower than one hertz. Unfortunately, high frequency torsional oscillation can lead to premature failures of BHA components. Hence, it would be well received in the drilling and geophysical exploration industries if a method for producing a BHA could be developed that reduces the high frequency torsional oscillations experienced by BHA components.

BRIEF SUMMARY

Disclosed is a method for estimating a location for disposing a tool in a drill tubular having a drill bit. The method includes: performing a modal analysis of the drill tubular to determine natural eigenfrequencies and corresponding eigenmodes of torsional oscillations of the model; selecting a predominant natural eigenfrequency and corresponding eigenmode from the determined natural eigenfrequencies and corresponding eigenmodes; performing a forced modal analysis of the drill tubular at the predominant eigenfrequency with a force or moment acting on the drill bit to provide a correlation between forced torsional deflection amplitude and position; and estimating the position to be within a range of positions wherein a vibration qualification of the tool is greater or equal to the torsional deflection amplitude throughout the range.

Also disclosed is a method for building a drill tubular having a drill bit. The method includes: performing a modal analysis of the drill tubular to determine natural eigenfrequencies and corresponding eigenmodes of torsional oscillations of the model;

selecting a predominant natural eigenfrequency and corresponding eigenmode from the determined natural eigenfrequencies and corresponding eigenmodes; performing a forced modal analysis of the drill tubular at the predominant eigenfrequency with a force or moment acting on the drill bit to provide a correlation between forced torsional deflection amplitude and position; and estimating a position of a tool to be within a range of positions wherein a vibration qualification of the tool is greater than or equal to the torsional deflection amplitude throughout the range; and disposing the tool in the drill tubular at the estimated position.

Further disclosed is a method for assembling a set of tools in a bottomhole assembly (BHA) of a drill tubular having a drill bit. The method includes: disposing the set of tools in a first set of positions in the BHA; performing a modal analysis of the drill tubular to determine natural eigenfrequencies and corresponding eigenmodes of torsional oscillations of the model; selecting a predominant natural eigenfrequency and corresponding eigenmode from the determined natural eigenfrequencies and corresponding eigenmodes; performing a forced modal analysis of the model at the predominant eigenfrequency with a force or moment acting on the drill bit to provide a correlation between forced torsional deflection amplitude and position; comparing a vibration qualification of each of the tools in the set to the forced torsional defection amplitude at the predominant eigenfrequency for the corresponding position of each of the tools; and disposing the set of tools in a second set of positions in the BHA if the vibration qualification of one or more tools is less than the torsional deflection amplitude at the predominant eigenfrequency; wherein each of the tools in the second set of positions have a vibration qualification that is greater than or equal to the torsional deflection amplitude at the predominant eigenfrequency for the corresponding position.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed is a method for producing or assembling a bottomhole assembly (BHA) in a drill string. The resultant assembly of tools reduces the levels of high frequency torsional vibrations or oscillations (HFTO) to which one or more critical tools or tool components will be exposed. Operational reliability will be increased when each of the tools is qualified for the calculated HFTO at the position of the corresponding tool in the BHA.

Figure 1:
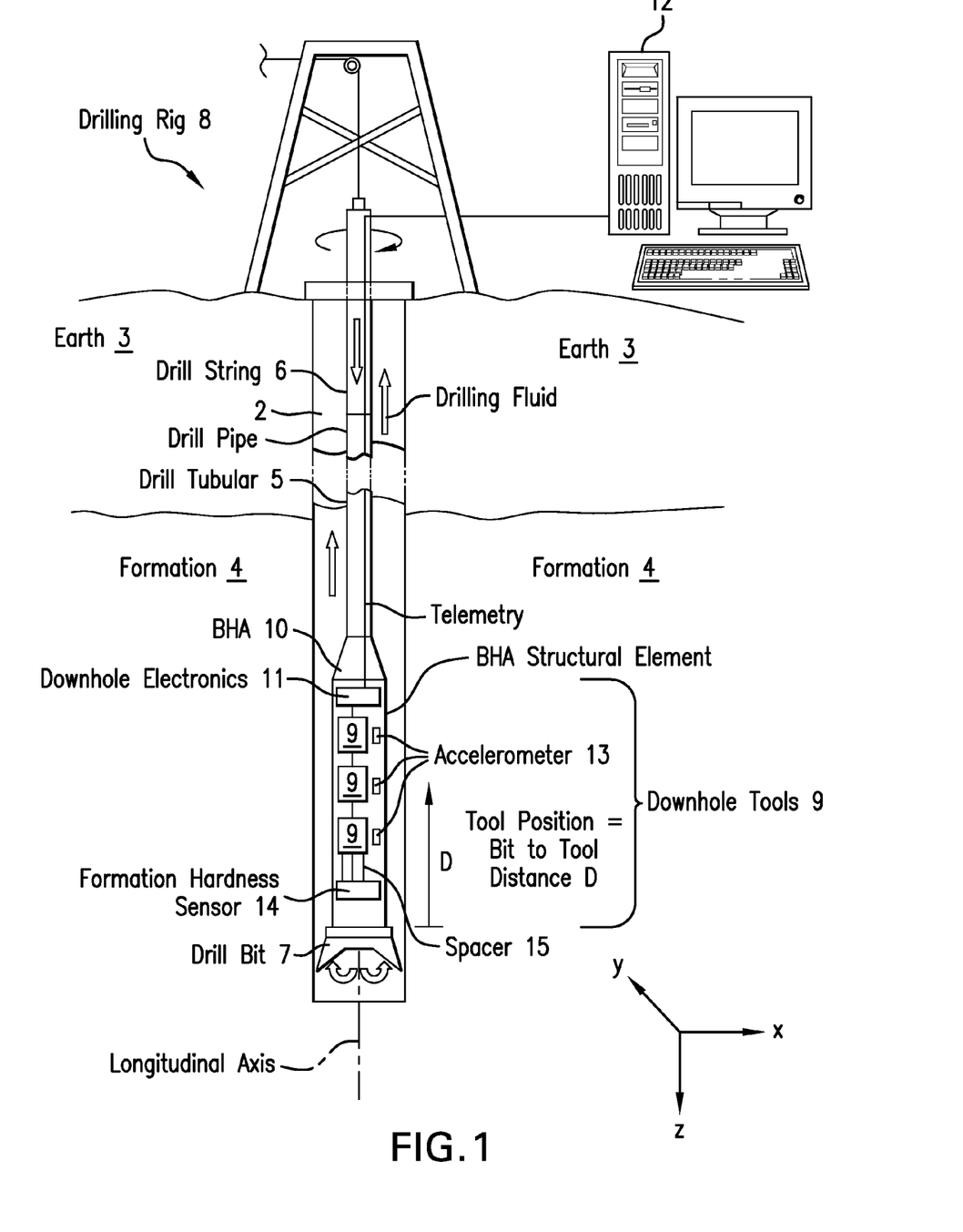
FIG. 1 illustrates a cross-sectional view of an exemplary embodiment of a bottomhole assembly (BHA) disposed in a borehole penetrating the earth.

FIG. 1 illustrates a cross-sectional view of an exemplary embodiment of a drill tubular 5 having a bottomhole assembly (BHA) 10 and disposed in a borehole 2 penetrating the earth 3. The earth 3 may include an earth formation 4, which may represent any subsurface material of interest that the borehole 2 may traverse. The drill tubular 5 in the embodiment of FIG. 1 is a string of coupled drill pipes referred to as a drill string 6. Disposed at the distal end of the drill string 6 is the BHA 10. A drill bit 7 disposed at the end of the drill string 6 is configured to be rotated to drill the borehole 2. The BHA 10 may include the drill bit 7 as illustrated in FIG. 1 or it may be separate from the BHA 10. A drill rig 8 is configured to conduct drilling operations such as rotating the drill string 6 and thus the drill bit 7 in order to drill the borehole 2. In addition, the drill rig 8 is configured to pump drilling fluid through the drill string 6 in order to lubricate the drill bit 7 and flush cuttings from the borehole 2. A mud motor (not shown) may also be included in the BHA 10.

The BHA 10 in FIG. 1 is configured to contain or support a plurality of downhole tools 9. In one or more embodiments, the downhole tools 9 are spaced apart or secured by a spacer 15 having a certain length. The downhole tools 9 represent any tools that perform a function downhole while drilling is being conducted or during temporary halt in drilling. In one or more embodiments, the function represents sensing of formation or borehole properties, which may include caliper of borehole, temperature, pressure, gamma-rays, neutrons, formation density, formation porosity, resistivity, dielectric constant, chemical element content, and acoustic resistivity, as non-limiting embodiments. In one or more embodiments, the downhole tools 9 include a formation tester configured to extract a formation fluid sample for surface or downhole analysis and/or to determine the formation pressure. In one or more embodiments, the downhole tools 9 may include a geo-steering device configured to steer the direction of drilling. The downhole tools 9 may include one or more accelerometers 13 that are configured to sense acceleration or vibration. In general, one or more accelerometers 13 may be located at each downhole tool 9 or corresponding position in order to sense the vibration experienced by the corresponding downhole tool 9. In one or more embodiments, the downhole tools 9 include a formation hardness sensor 14. The formation hardness sensor 14 may be a gamma-ray detector configured to detect gamma-rays emitted by the formation 4. Generally, a gamma-ray count rate below a certain threshold may be indicative of a hard formation, which when interacting with a drill bit may cause HFTO. Alternatively, the formation hardness sensor 14 may be a bulk density sensor. Generally, a formation having a bulk density above a certain threshold may be indicative of a hard formation, which when interacting with a drill bit may cause HFTO.

Downhole electronics 11 may be configured to operate one or more tools in the plurality of downhole tools 9, process measurement data obtained downhole, and/or act as an interface with telemetry to communicate measurement data or commands between downhole components and a computer processing system 12 disposed at the surface of the earth 3. Non-limiting embodiments of the telemetry include pulsed-mud and wired drill pipe. System operation and data processing operations may be performed by the downhole electronics 11, the computer processing system 12, or a combination thereof. In one or more embodiments, the formation hardness sensor 9 is a gamma-ray detector and/or bulk density sensor. A processor such as in the computer processing system 12 may be used to implement the teaching disclosed herein.

Figure 2:
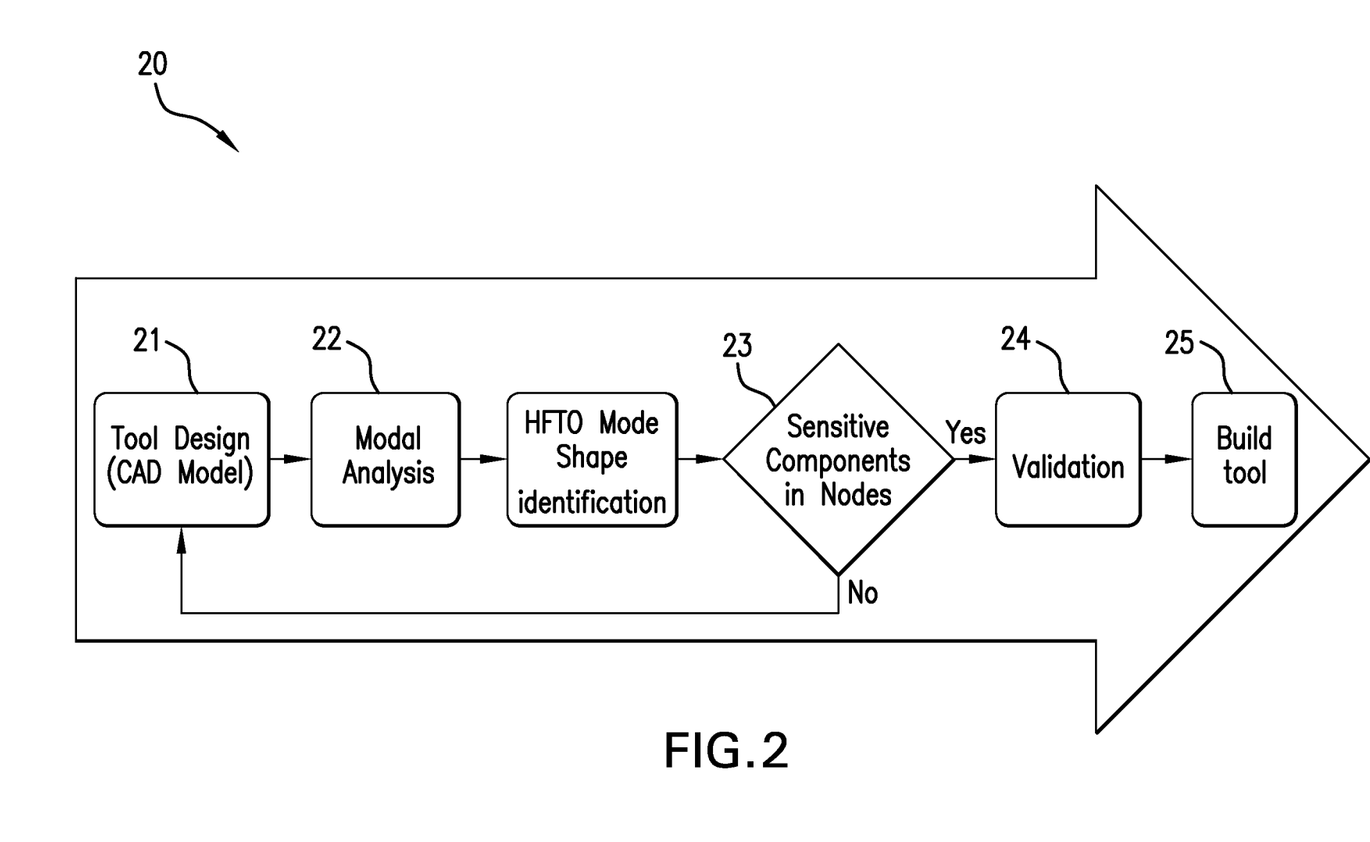
FIG. 2 is a flow chart for a method for producing a bottomhole assembly.

Reference may now be had to FIG. 2, which depicts a flow chart for a method 20 for estimating a location for disposing a tool in a drill tubular having a drill bit. Block 21 calls for modeling the drill tubular and a BHA portion of the drill tubular if the drill tubular includes one. In one or more embodiments, the drill tubular is modeled as a finite-element network such as would be obtained using a computer-aided-design (CAD) software package. Non-limiting embodiments of the CAD software are Solid Works, ProEngineer, Auto-CAD, and CATIA. The model may be a three-dimensional model or a two-dimensional model if the drill tubular is symmetrical about a longitudinal axis. The model includes a geometry of the drill tubular and material properties of the drill tubular such as density (e.g., to give weight distribution) and stiffness (e.g., to determine flex). The stiffness data may include elasticity and/or Poison's Ratio. It can be appreciated that if a tool is configured to be a structural part of the drill tubular, then the tool will be modeled as part of the drill tubular.

Figure 3:
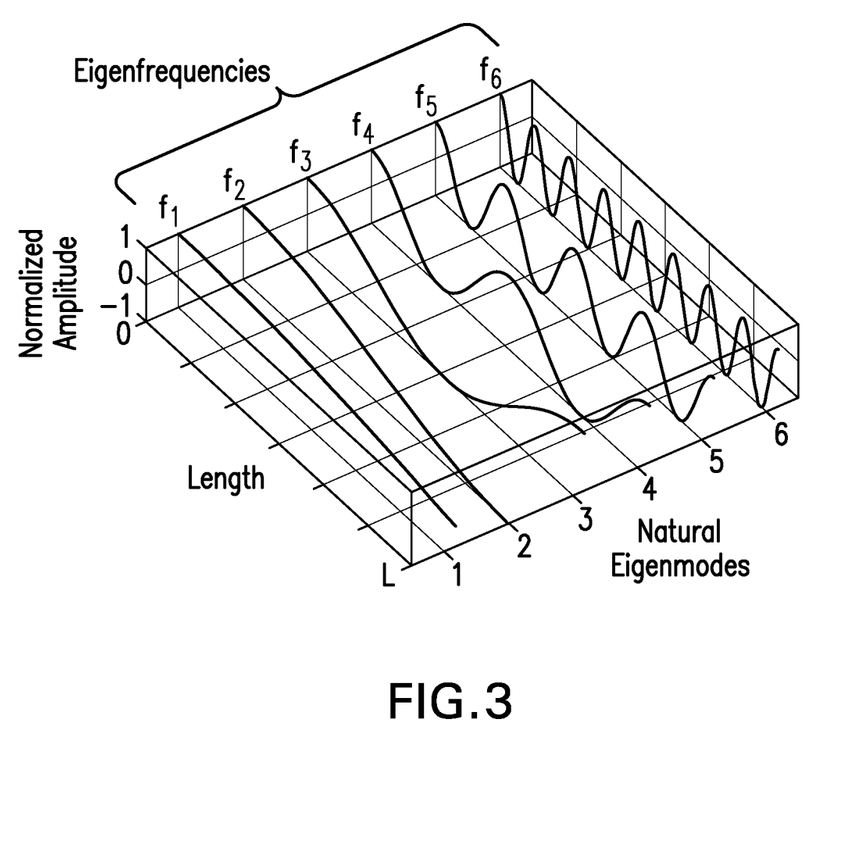
FIG. 3 depicts aspects of eigenfrequencies and eigenmodes for a simple structure.

Block 22 calls for performing a modal analysis of the model using modal analysis techniques as known in the art. The modal analysis relates to analysis of the torsional vibrations or oscillations experienced by the drill tubular. The modal analysis determines the natural mode shapes and frequencies of the drill tubular during free vibration. In general, the modal analysis techniques may include the finite element method to perform this analysis. Alternatively, an analytical method, a finite difference method, or a transfer matric method may be used in the modal analysis. In lieu of or in addition to the above methods, an experimental analysis may be performed in a laboratory. The types of equations used in modal analysis are those seen in eigensystems. The physical interpretation of the eigenvalues and eigenvectors that come from solving the system of equations is that they represent the frequencies (i.e., eigenfrequencies) and corresponding mode shapes (i.e., eigenmodes) relating to the free vibration of the drill tubular. FIG. 3 is a three-dimensional plot illustrating the six first natural eigenmodes and frequencies ($f_1$, $f_2$, $f_3$, $f_4$, $f_5$, and $f_6$) of a simple structure (i.e., a torsional beam) of length L. Each natural eigenmode corresponds to a different natural frequency (i.e., eigenfrequency). Each natural eigenmode has a distinctive shape (i.e., mode shape) with different locations of nodes (where response curve has zero amplitude) and anti-nodes (where response curve has maximum amplitude either positive or negative relative to adjacent portions). It can be appreciated that at a node the torque experienced by the drill tubular is a maximum relative to regions adjacent to the node. In order for there to be zero amplitude at the node, the drill tubular experiences a torque of sufficient magnitude to resist torsional movement while regions adjacent to the node experience less torque resulting in some amplitude of movement.

Following the modal analysis, a predominant eigenfrequency is selected. In general, the predominant eigenfrequency results in an eigenmode having the greatest amplitude at some position along the drill tubular. In one or more embodiments, a maximum amplitude occurs wherein the drill tubular meets the drill bit. Thus, an eigenfrequency of the drill tubular having a maximum amplitude of torsional deflection at the drill bit may be selected as the predominant eigenfrequency.

Following the selection of the predominant eigenfrequency, a forced modal analysis is performed on the model using a force or moment imposed on the drill bit. It can be appreciated that the force or moment imposed on the drill bit is a function of the drill bit design, formation hardness, and dynamic drilling parameters such as weight-on-bit, rate-of-penetration, and rotational speed and that the force may be calculated using mechanical analysis. The finite element method is also used for this analysis. The forced modal analysis provides a curve of torsional deflection amplitude versus distance from drill bit. From this curve, nodes and anti-nodes are noted. The shape of this curve is the mode shape.

Block 23 of the method 20 calls for comparing the vibration qualification for each of the tools in the drill tubular to the range of torsional deflection amplitudes at the positions along the drill tubular each of the tools occupies. The vibration qualification relates to the maximum vibration or acceleration that a tool was designed and tested to for operation within specifications. Hence, a tool subjected to vibrations that exceed its vibration qualification may be expected to fail or operate outside of its specifications, while a tool subjected to vibrations below its vibration qualification may be expected to operate reliably within its specifications. If the vibration qualification of a tool is less than the vibration calculated by the modal analysis in the range of positions (e.g., range of distances from the drill bit) occupied by the tool along the drill tubular, then the location of the tool may be shifted to positions where the calculated vibration is less than the vibration qualification. Alternatively, the tool may be redesigned to withstand the calculated vibrations such as by altering the tool geometry (e.g., lengthen or shorten the tool) or by strengthening structural members (e.g., increasing thickness) of the tool or drill tubular.

Block 24 of the method 20 calls for optionally validating the results of the forced modal analysis. In one or more embodiments, validation is performed by testing the final tool configuration by drilling a borehole and obtaining vibration data for each tool using one or more accelerometers 14 that measure the vibration to which each tool is subjected. If the vibration data does not agree with the torsional oscillations calculated by the forced modal analysis, then the data used in the analysis (e.g., stiffness data and/or drill bit forces) can be updated so that the measured data and the calculated response agree with each other.

Figure 4:
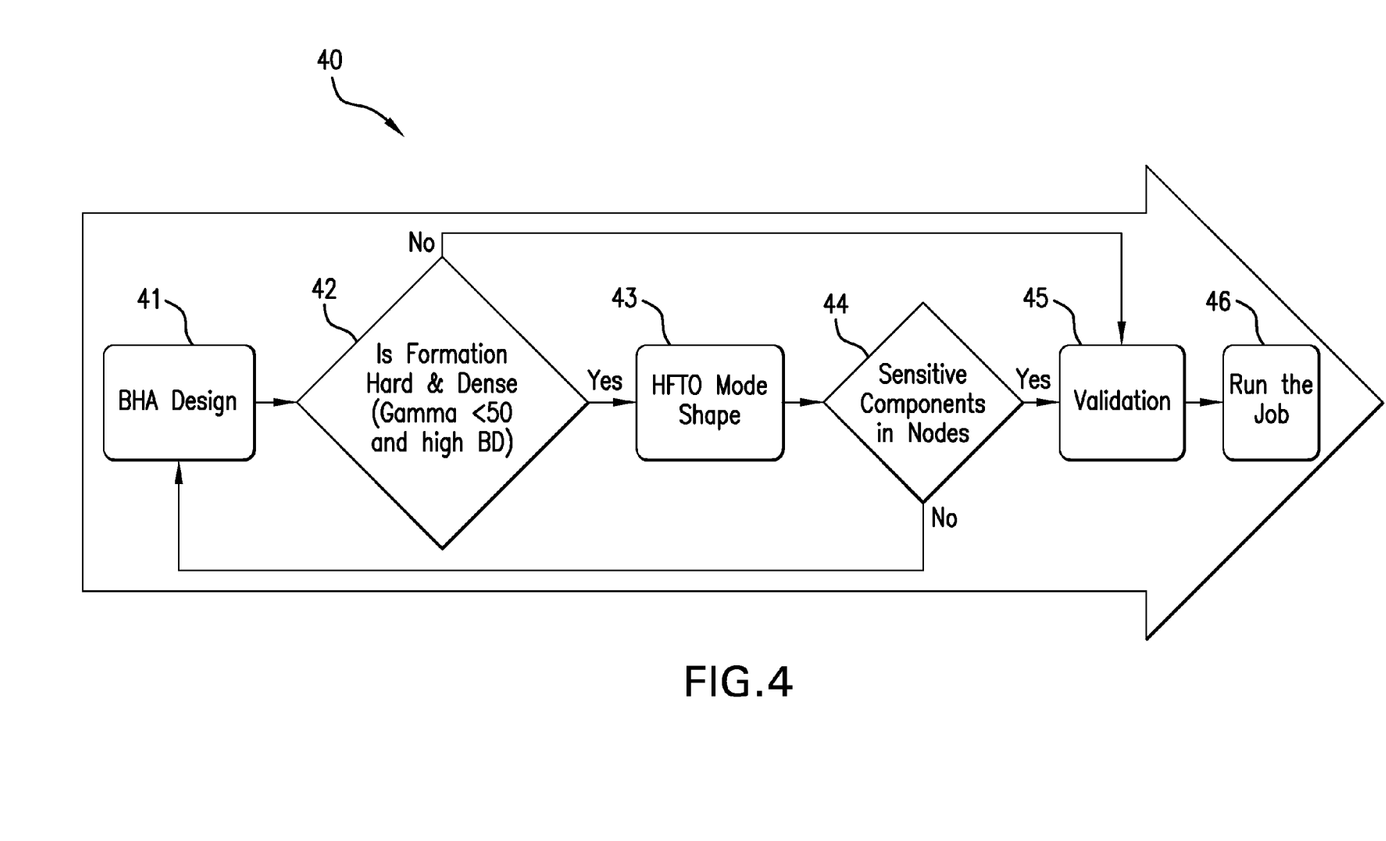
FIG. 4 is a flow chart for a method for assembling a BHA with a certain set of tools.

FIG. 4 is a flow chart for a method 40 for assembling a set of tools in a bottomhole assembly (BHA) of a drill tubular having a drill bit. Block 41 calls for modeling the BHA and drill tubular as in block 21 of the method 20. Block 42 calls for sensing the hardness of the formation using the formation hardness sensor 14. If the hardness is below a selected threshold, then high frequency torsional oscillations may not pose a problem and the current BHA design may be optionally validated in block 44, which compares vibration data obtained from one or more of the accelerometers 13 with the vibration qualification of each tool. If the hardness is at or above the selected threshold, then the set of tools may be subjected to high frequency torsional oscillations and a modal analysis, predominant eigenfrequency selection and forced modal analysis will be performed as in block 22 of the method 20. Block 44 calls for comparing the vibration qualification for each of the tools in the BHA to the range of torsional deflection amplitudes at the positions along the BHA that each of the tools occupies, similar to block 23 of the method 20. If the vibration qualification of a tool is less than the vibration calculated by the modal analysis in the range of positions occupied by the tool along the BHA, then the location of the tool may be shifted to positions where the calculated vibration is less than the vibration qualification. This step may include reconfiguring the positions of the tools such as by adding or removing spacers or using different length spacers so that the tools have locations corresponding to positions where the vibration qualification of each tool meets or exceeds the torsional deflection amplitudes calculated by the modal analysis. Once the tool configuration in the BHA is finalized, then this configuration can be optionally validated in block 44.

Figure 5A:
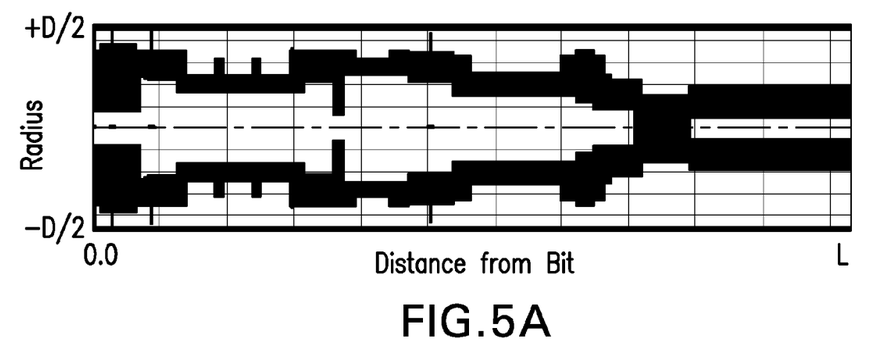
FIG. 5A depicts aspects of a cross-sectional view of geometry of a BHA.
Figure 5B:
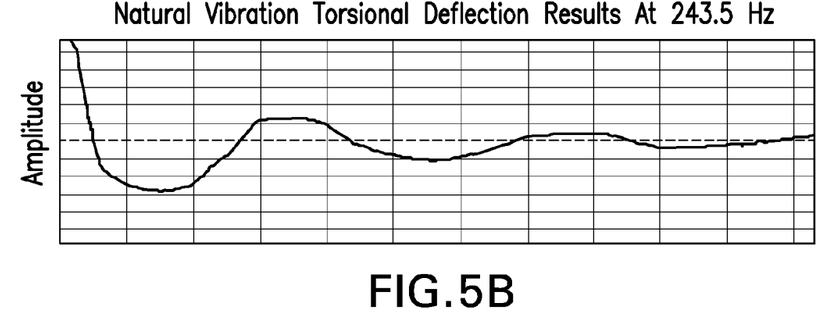
FIG. 5B depicts aspects of natural vibration torsional deflection at a dominant frequency of the BHA.
Figure 5C:
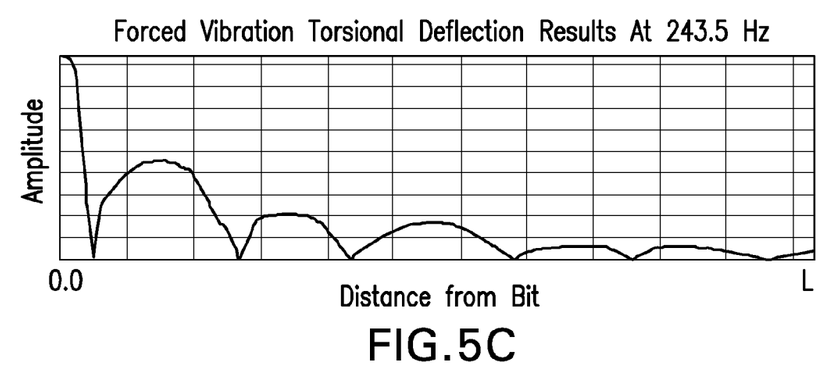
FIG. 5C depicts aspects of forced vibration torsional deflection at the dominant frequency of the BHA.

Next, one example of the modal analysis is presented for the drill tubular and BHA illustrated in a cross-sectional view in FIG. 5A. The eigenfrequencies for this embodiment were determined to be 49, 70, 111, 160, 202, 243.5, and 354 Hz using the finite method. The eigenfrequency at 243.5 Hz was determined to be the predominant eigenfrequency because it had the highest torsional oscillation amplitude, which occurred at the drill bit. The natural vibration torsional deflection results at 243.5 Hz are illustrated in FIG. 5B. A forced modal analysis was performed at the predominant eigenfrequency using known forces exerted on the drill tubular such as drill bit forces. The forced vibration torsional deflection results at 243.5 Hz are illustrated in FIG. 5C. Nodes and anti-nodes are noted. In one or more embodiments, a location of each tool is in a range of positions or distances from the drill bit that includes a node. In addition, the structure of the drill tubular or BHA at the nodes should be sufficiently robust to withstand the torque exerted at these nodes. In one or more embodiments, if the calculated stress level of a structural element at a location exceeds a threshold stress level, then the structural element at that location may be strengthened, such as by using a thicker material, or if the structural element is part of a tool, then the tool may be relocated to a location where a calculated stress level is less than the threshold stress level. It can be appreciated that the threshold stress level may be a yield stress of a structural element material or a fatigue stress level where continued vibration exceeding the fatigue stress level will cause cracks in the structural element material to form.

The above disclosed techniques provide several advantages. One advantage is that tool and BHA design can be analyzed using the modal analysis to identify any weaknesses early in the design process before the actual tools are designed or assembled and used in the field. This improves the reliability of the tools and avoids the cost of malfunctions in field operations, which may lead to costs associated with delays, repairs, and redesign. Similarly, actual tool designs and configurations using a specified set of tools may be analyzed before being deployed in the field.

As noted above, the modal analysis or the forced modal analysis may be performed by experimental analysis. In one or more embodiments of the experimental analysis, the drill tubular or a portion of interest of the drill tubular such as the BHA is instrumented with accelerometers and subjected to vibrations at various amplitudes and/or frequencies using a shake table. The outputs of the accelerometers are logged using a data logger and analyzed to determine the eigenmodes and eigenfrequencies. In an experimental forced modal analysis, a force or moment is applied to the drill bit coupled to the drill tubular or portion of interest of the drill tubular while the drill tubular or portion of interest of the drill tubular is subjected to vibrations at one or more frequencies and/or amplitudes. As with the modal analysis, the outputs of the accelerometers are logged and analyzed to determine the forced response amplitude. It can be appreciated that a full-scale or reduced-scale model may also be tested.

The above teachings relate to analyzing torsional vibrations or oscillations of a drill tubular. It can be appreciated these teachings can also be applied to analyzing lateral vibrations and/or axial vibrations of a drill tubular. That is, the teachings herein can also be used to determine the eigenmodes, eigenfrequencies and forced response amplitudes for different vibration directions of a drill tubular.

In support of the teachings herein, various analysis components may be used, including a digital and/or an analog system. For example, the downhole tools 9, the downhole electronics 11, the computer processing system 12, the accelerometers 13, or the formation hardness sensor 14 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a location for disposing a tool in a drill tubular having a drill bit, the method comprising:
    performing a modal analysis of the drill tubular to determine natural eigenfrequencies and corresponding eigenmodes of torsional oscillations of the model;
    selecting a predominant natural eigenfrequency and corresponding eigenmode from the determined natural eigenfrequencies and corresponding eigenmodes, the predominant eigenfrequency having a frequency that is higher than the lowest determined eigenfrequency and providing a mode shape corresponding to the predominant eigenfrequency having an absolute single maximum amplitude of torsional deflection at the drill bit;
    performing a forced modal analysis of the drill tubular at the predominant eigenfrequency with a force or moment acting on the drill bit to provide a correlation between forced torsional deflection amplitude and position; and
    estimating the position to be within a range of positions wherein a vibration qualification of the tool is greater or equal to the torsional deflection amplitude throughout the range.

2. The method according to claim 1, wherein the maximum torsional deflection magnitude occurs where the drill tubular is attached to the drill bit.

3. The method according to claim 1, further comprising creating a mathematical model of the drill tubular, the model comprising a geometry of the drill tubular and a density and stiffness of a material of the drill tubular.

4. The method according to claim 3, wherein the modal analysis is performed on the model.

5. The method according to claim 3, wherein the forced modal analysis is performed on the model.

6. The method according to claim 1, wherein the modal analysis is performed by experiment.

7. The method according to claim 6, wherein the experiment is performed on a portion of interest of the drill tubular or a scale model of a portion of interest of the drill tubular.

8. The method according to claim 1, wherein the drill tubular comprises a mud motor configured to turn the drill bit using energy from circulating drilling fluid.

9. A method for building a drill tubular having a drill bit, the method comprising:
    performing a modal analysis of the drill tubular to determine natural eigenfrequencies and corresponding eigenmodes of torsional oscillations of the model;
    selecting a predominant natural eigenfrequency and corresponding eigenmode from the determined natural eigenfrequencies and corresponding eigenmodes, the predominant eigenfrequency having a frequency that is higher than the lowest determined eigenfrequency and providing a mode shape corresponding to the predominant eigenfrequency having an absolute single maximum amplitude of torsional deflection at the drill bit;
    performing a forced modal analysis of the drill tubular at the predominant eigenfrequency with a force or moment acting on the drill bit to provide a correlation between forced torsional deflection amplitude and position; and
    estimating a position of a tool to be within a range of positions wherein a vibration qualification of the tool is greater than or equal to the torsional deflection amplitude throughout the range; and
    disposing the tool in the drill tubular at the estimated position.

10. The method according to claim 9, wherein the tool comprises a plurality of tools and each tool is disposed in the drill tubular in a range of positions wherein a vibration qualification for each tool is greater than or equal to the torsional deflection amplitude throughout the corresponding range of positions.

11. The method according to claim 10, wherein a spacer is disposed between a first tool and a second tool in the plurality of tools.

12. The method according to claim 9, wherein the range of positions comprises a node where the torsional deflection amplitude is zero.

13. The method according to claim 12, further comprising calculating a stress experienced by a drill tubular structure at the node.

14. The method according to claim 13, further comprising comparing the calculated stress at the node to a threshold stress for a drill tubular structure at the node.

15. The method according to claim 14, further comprising strengthening the drill tubular structure if the threshold stress is less than the calculated stress.

16. The method according to claim 14, further comprising relocating the drill tubular structure to a location within a range of positions not having a node if the threshold stress is less than the calculated stress.

17. A method for assembling a set of tools in a bottomhole assembly (BHA) of a drill tubular having a drill bit, the method comprising:
   disposing the set of tools in a first set of positions in the BHA;
   performing a modal analysis of the drill tubular to determine natural eigenfrequencies and corresponding eigenmodes of torsional oscillations of the model;
   selecting a predominant natural eigenfrequency and corresponding eigenmode from the determined natural eigenfrequencies and corresponding eigenmodes, the predominant eigenfrequency having a frequency that is higher than the lowest determined eigenfrequency and providing a mode shape corresponding to the predominant eigenfrequency having an absolute single maximum amplitude of torsional deflection at the drill bit;
   performing a forced modal analysis of the model at the predominant eigenfrequency with a force or moment acting on the drill bit to provide a correlation between forced torsional deflection amplitude and position;
   comparing a vibration qualification of each of the tools in the set to the forced torsional defection amplitude at the predominant eigenfrequency for the corresponding position of each of the tools; and
   disposing the set of tools in a second set of positions in the BHA if the vibration qualification of one or more tools is less than the torsional deflection amplitude at the predominant eigenfrequency;
   wherein each of the tools in the second set of positions have a vibration qualification that is greater than or equal to the torsional deflection amplitude at the predominant eigenfrequency for the corresponding position.

18. The method according to claim 17, further comprising disposing a spacer between a first tool and a second tool in the set, the spacer being configured to maintain the positions of the first and second tools.

19. The method according to claim 17, further comprising sensing the hardness of a subsurface material being drilled by the drill tubular using a hardness sensor disposed at the drill tubular and determining the force acting on the drill bit using the sensed hardness.

20. The method according to claim 17, further comprising validating the second set of positions by comparing vibration data obtained from one or more accelerometers disposed at the BHA at each tool position while drilling a borehole to the vibration qualification of each of the tools.

* * * * *